(12) United States Patent
Peng

(10) Patent No.: US 7,212,398 B2
(45) Date of Patent: May 1, 2007

(54) RACK-MOUNT STRUCTURE FOR MOUNTING LCD DISPLAY

(75) Inventor: Juen-Tien Peng, Chung Li (TW)

(73) Assignee: Action Electronics Co., Ltd., Chung Li (TW)

( * ) Notice: Subject to any disclaimer, the term of this patent is extended or adjusted under 35 U.S.C. 154(b) by 488 days.

(21) Appl. No.: 10/788,360

(22) Filed: Mar. 1, 2004

(65) Prior Publication Data

US 2005/0189461 A1    Sep. 1, 2005

(51) Int. Cl.
*G06F 1/16* (2006.01)

(52) U.S. Cl. ..................... 361/681; 361/683
(58) Field of Classification Search ................ 361/681, 361/683–686
See application file for complete search history.

(56) References Cited

U.S. PATENT DOCUMENTS 6,199,810 B1 * 3/2001 Wu et al. ................ 248/291.1
2002/0140687 A1 * 10/2002 Takeda ....................... 345/204

* cited by examiner

*Primary Examiner*—Yean-Hsi Chang
(74) *Attorney, Agent, or Firm*—Rosenberg, Klein & Lee

(57) ABSTRACT

A rack-mount structure has a roof mount fitted to the roof, the roof mount includes a slot therein, a suspending frame pivotally connected to one side of the slot, and a latching mechanism for releasably securing the flat panel display to the suspending frame. The suspending frame has a receiving space for receiving a flat panel display therein. A pair of latching members is formed on the roof mount and the suspending frame to lock the suspending frame within the slot. A release button controlling the engagement between the latching members can also be formed on the roof mount or the suspending frame. One side of the receiving space of the suspending frame is covered with a mirror plate or a glass plate.

13 Claims, 4 Drawing Sheets

RACK-MOUNT STRUCTURE FOR MOUNTING LCD DISPLAY

BACKGROUND OF THE INVENTION

The present invention relates in general to a rack mount device, and more particularly, to a rack mount device installed on a top of a vehicle or a location for mounting a liquid crystal display operative to provide both audio and video display functions.

Vehicles have become the major transportation tool for modern society. For the large size bus, televisions are often mounted to the top of the bus for entertaining the passengers. However, the conventional rack for mounting or installing the televisions is typically very large and heavy. Thus, it very easily blocks the view of both the passengers and the driver. It is also very dangerous for tall people. Such type of rack is not suitable for use in a small size family car. In the small size car, the television is typically in the form of a liquid crystal display embedded in the middle of the dashboard. Therefore, it is not convenient for the passengers in the back seats to watch. Further, for entertaining purposes, video devices such as VCD or DVD are also installed in the vehicle to provide programming for the display. This is therefore very costly. When the driver or owner is away from the car, the car is often stolen or damaged because of the high-value video system installed therein.

BRIEF SUMMARY OF THE INVENTION

The present invention provides a rack-mount structure for a flat panel display allowing the flat panel display to be easily attached therein and removed therefrom. Therefore, the driver can remove the flat panel display when the vehicle is unattended.

The present invention also provides a rack-mount structure allowing a flat panel display to be mounted to the ceiling of a vehicle, such that the driver will not be distracted by the display as when the display is embedded in the dashboard, and the view for the backseat passengers is much improved.

The present invention further provides a rack-mount structure allowing the flat panel display to be extended perpendicularly to the roof of the vehicle or retracted in the rack mount in parallel with the top of the vehicle, such that very limited space of the vehicle is occupied when the display is not in use, and the view for the back seat passengers will not be obstructed.

The rack-mount structure provided by the present invention includes a roof mount fitted to the roof, the roof mount includes a slot therein, a suspending frame pivotally connected to one side of the slot, and a latching mechanism for releasably securing the flat panel display to the suspending frame. The suspending frame includes a receiving space for receiving a flat panel display therein. A pair of latching members is formed on the roof mount and the suspending frame to lock the suspending frame within the slot. A release button controlling the engagement between the latching members can also be formed on the roof mount or the suspending frame. One side of the receiving space of the suspending frame is covered with a mirror plate or a glass plate.

The rack-mount structure further includes an illumination device and a power switch for the illumination device. In one embodiment, the power switch is interlocked with the suspending frame and controlled by the movement of the suspending frame. The latching mechanism includes a female latching member formed on the suspending frame at one side of the receiving space and a male latching member formed on one side of the flat panel display. The suspending frame includes at least one power supply terminal at one side of the receiving space, and the flat panel display includes a power input terminal to be connected to the power supply terminal when installed in the suspending frame.

The present invention further provides a rack-mount flat panel display to be installed on a roof or ceiling of a vehicle, comprising a rack mount and a flat panel display. The rack mount comprises a roof mount fitted on the roof and a suspending frame pivotally connected to the roof mount. The roof mount includes a slot allowing the suspending frame to be retracted therein. The flat panel display is removably installed in the receiving space. The display further comprises a female member formed at one side of the receiving space, and a male latching member formed on the flat panel display. The male and female latching members are engageable with each other. The flat panel display includes a liquid crystal display, for example. The display further comprises a pair of latching members formed on the roof mount and the suspending frame for securing the suspending frame within the slot.

BRIEF DESCRIPTION OF THE DRAWINGS

These, as well as other features of the present invention, will become apparent upon reference to the drawings wherein.

DETAILED DESCRIPTION OF THE INVENTION

Figure 1:
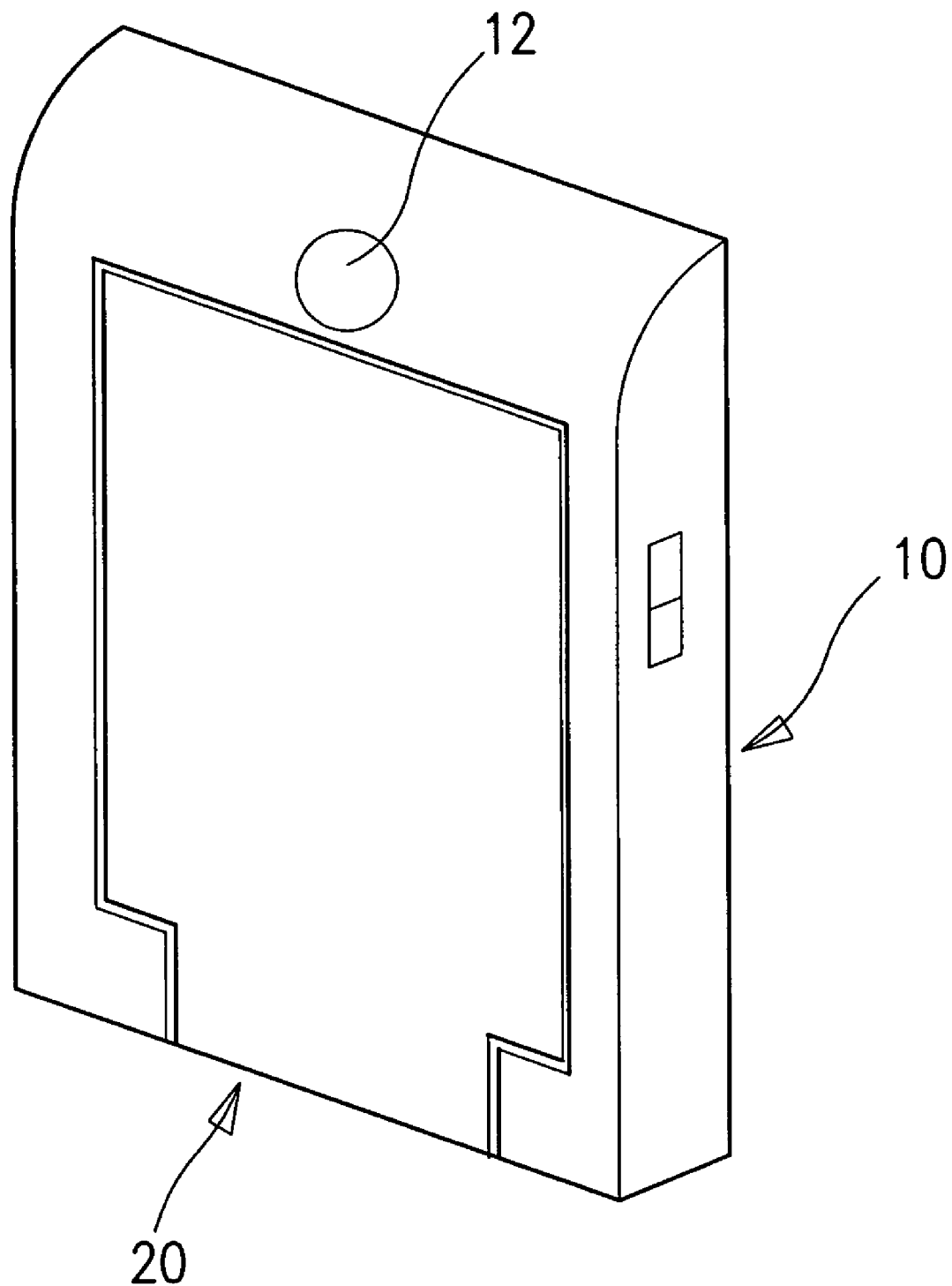
FIG. 1 comprises a perspective view of a rack-mount structure provided in accordance with the present invention.
Figure 2:
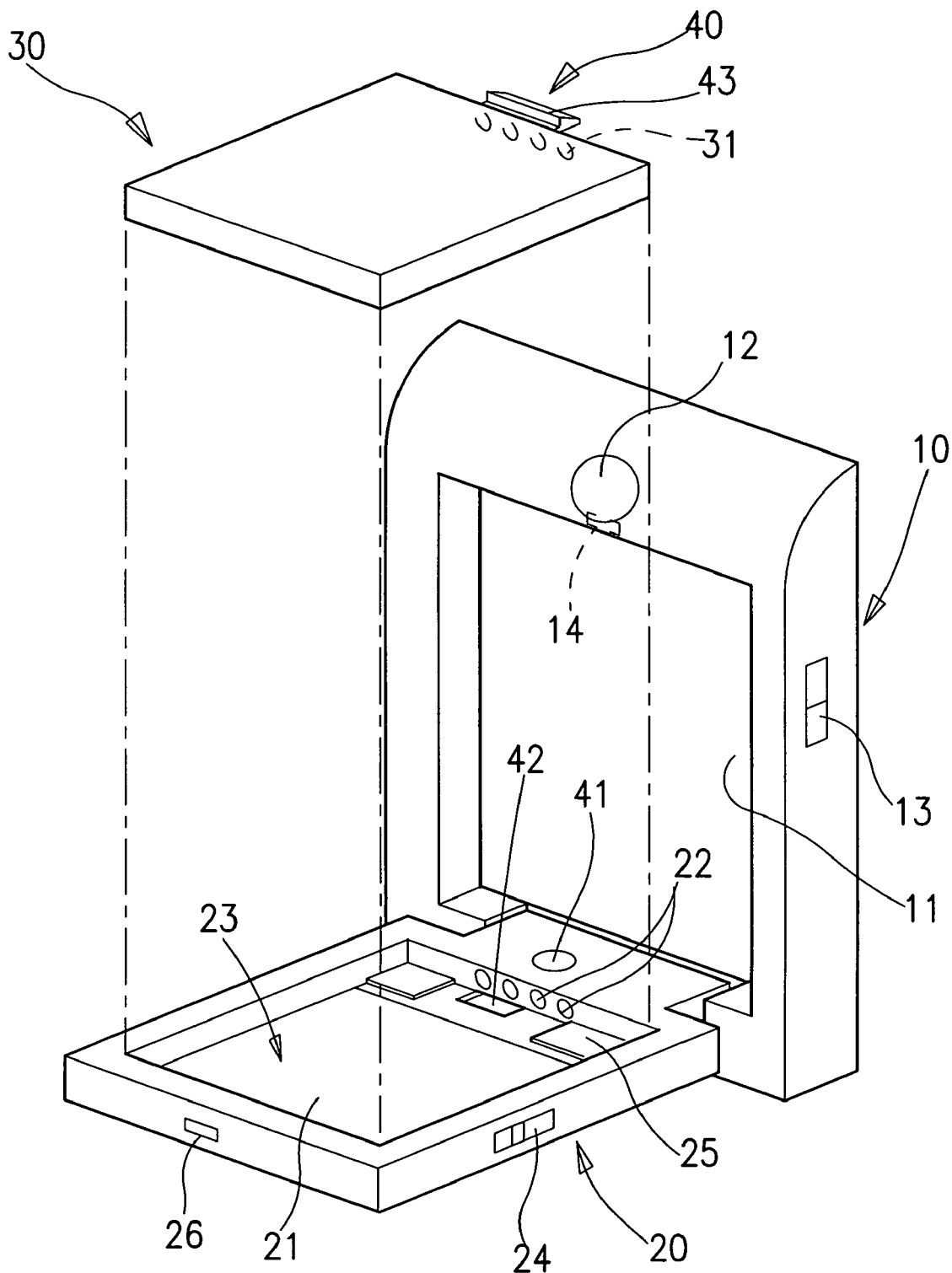
FIG. 2 shows an exploded view of the rack-mount structure.
Figure 3:
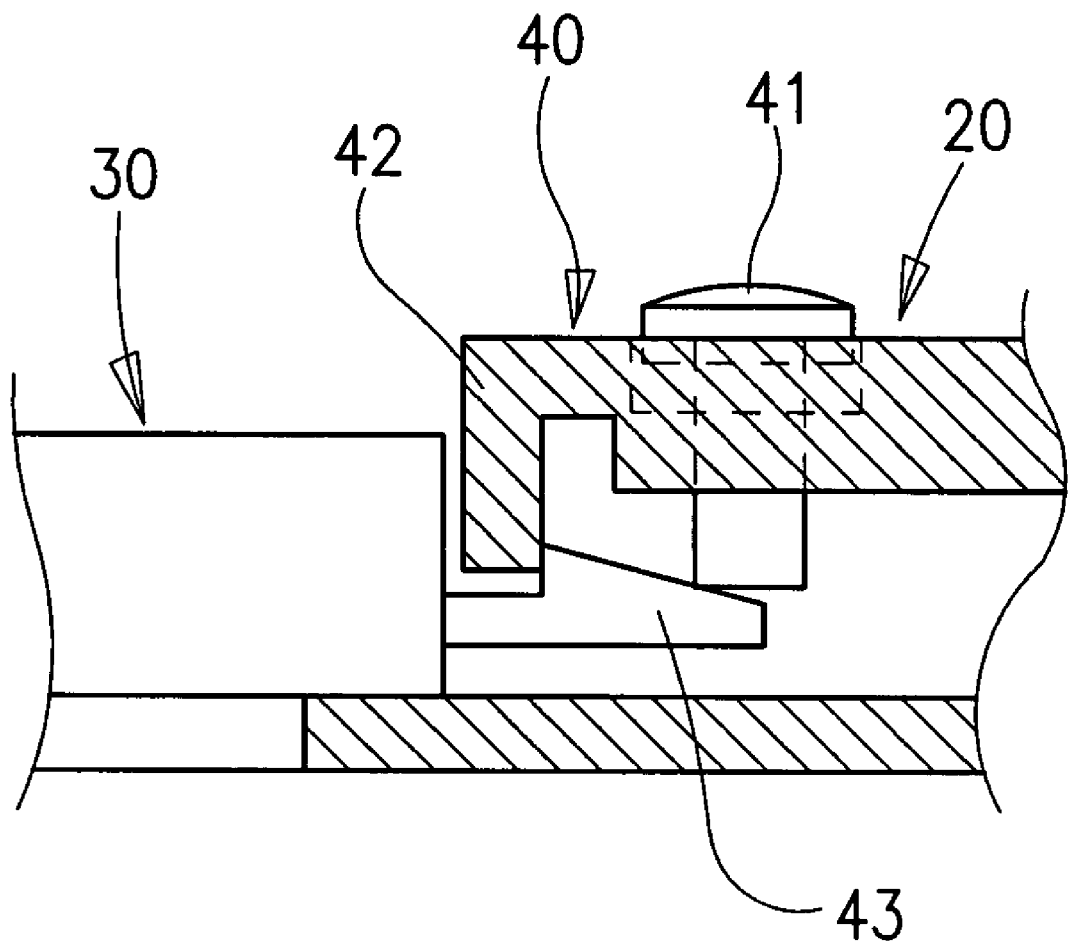
FIG. 3 illustrates a fastening mechanism of the rack-mount structure.

Referring now to the drawings wherein the showings are for purpose of illustrating preferred embodiments of the present invention only, and not for purposes of limiting the same. As shown in FIGS. 1–3, the present invention provides a rack-mount structure for mounting a flat panel display. The rack-mount structure includes a roof mount 10, a suspending frame 20, and a latching mechanism 40. The roof mount 10 includes a slot 11, a release button 12 and a power switch 13. The slot 11 includes a male latching member 14 controlled by the release button 12. The suspending frame 20 is pivotally connected to one side of the roof mount 10. As shown, suspending frame 20 includes a receiving space 23 for accommodating a flat panel display 30 therein. One side of the receiving space 23 may be covered by a glass or mirror surface 21. The suspending frame 20 includes power source terminals 22 formed on one sidewall of the receiving space 23, an illumination device 25, and a power switch 24 for the illumination device 25 formed on a position of the suspending frame 20 accessible to the user. It is appreciated that the illumination device 25 and/or the power switch 24 can also be installed in the slot 11. Alternatively, the illumination device 25 may be activated by a power switch 24 that is activated by the movement of the suspending frame 20. That is, when the suspending frame 25 rotates to an open position, the power switch 24 is automatically activated to switch on the illumination device 25. When the suspending frame 25 rotates to a close position, the power switch 24 is interlocked to an off position, such that the illumination device 25 is switched off. The suspending frame 25 further comprises a female latching member 26 to be engaged with the male latching member 14, such that the suspending frame 20 and the flat panel display 30 can be retracted and secured in the slot 11.

The flat panel display 30 includes a liquid crystal display detachably installed in the receiving space 23 of the suspending frame 20. The power input terminals 31 of the flat panel display 30 are connected to the power source terminals 22 of the suspending frame 20. The on/off status of the flat panel display 30 is controlled by the power switch 13.

The latching mechanism 40 is installed between the suspending frame 20 and the flat panel display 30 for securing the flat panel display 30 in the receiving space 23 of the suspending frame 20. The latching mechanism 40 includes a release button 41, a female latching member 42 formed on the suspending frame 20, and a male latching member 43 formed on the flat panel display 30. In this embodiment, the male latching member 43 includes a barb to be locked by the female latching member 42. The flat panel display 30 can be easily removed from the suspending frame 20 by pressing the release button 41. Therefore, the flat panel display 30 will not be fixed in an unattended vehicle.

Figure 4:
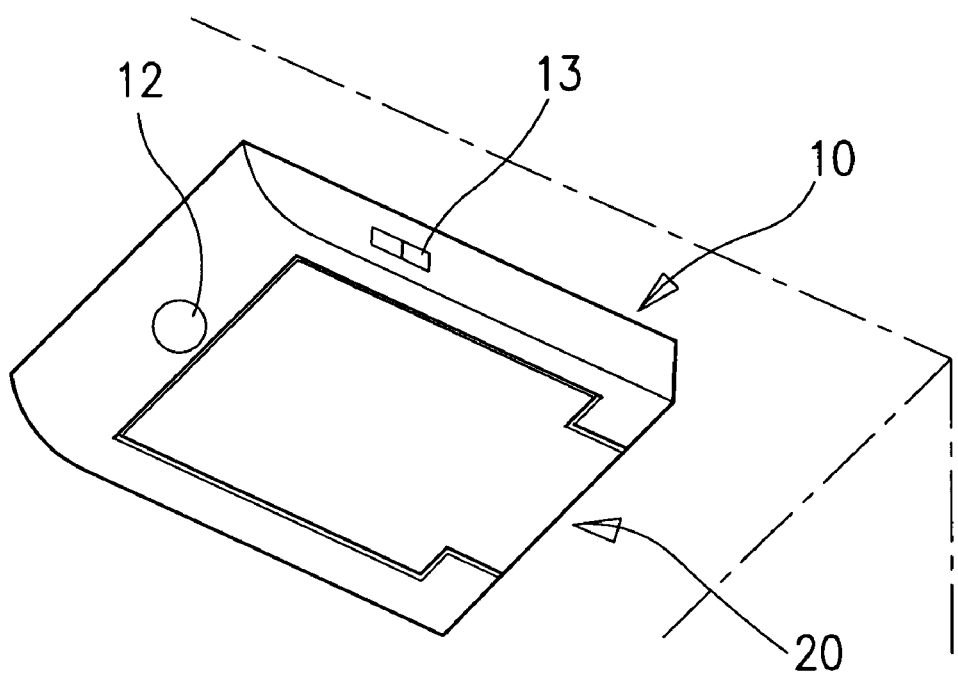
FIG. 4 shows the installation of the rack-mount structure.
Figure 5:
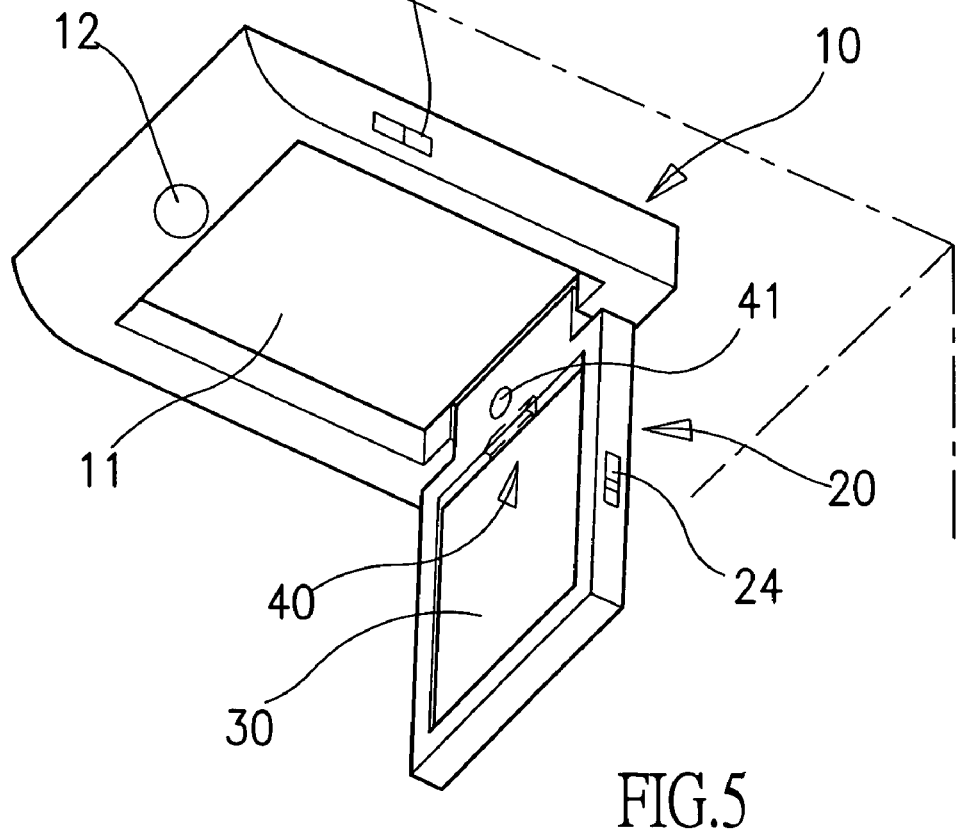
FIG. 5 shows the application of the rack-mount structure.

Referring to FIGS. 2, 4 and 5, the rack-mount structure provided by the present invention can be installed in various positions of a vehicle. By pressing the release button 12, the latching members 14 and 26 are disengaged from each other, such that the suspending frame 20 is free to fold down for display. In one embodiment, the power switches 13 and 24 can also be formed on or in the dashboard allowing the driver to control and operate the flat panel display 30 and the illumination device 25.

In addition to the upright position, the pivot mechanism between the slot 11 and the suspending frame 20 may also be designed to allow the suspending frame 20 to be flipped with 180° to the roof or rotated at varying degrees or angles between 0 degrees and 180 degrees to provide a wide variety of viewing angles based upon desires or requirements. Positioning structures may also be used for properly positioning the suspending frame 20 with a desired angle.

According to the above, the present invention provides a rack-mount structure allowing a flat panel display to be removably attached thereto. Further, the rack-mount structure allows the flat panel display to be retracted in parallel with the roof of the vehicle, such that the space occupied by the rack-mount and the flat panel display is greatly saved.

This disclosure provides exemplary embodiments of a rack-mount structure for mounting LCD display. The scope of this disclosure is not limited by these exemplary embodiments. Numerous variations, whether explicitly provided for by the specification or implied by the specification, such as variations in shape, structure, dimension, type of material or manufacturing process may be implemented by one of skill in the art in view of this disclosure.

What is claimed is:

1. A rack-mount structure installed on a roof of a vehicle, comprising:
   a roof mount fitted to the roof, the roof mount includes a slot therein;
   a suspending frame pivotally connected to one side of the slot, the suspending frame including a receiving space for receiving a flat panel display therein and a mirror plate covering one side of the receiving space; and
   a latching mechanism for releasably securing the flat panel display to the suspending frame.

2. The structure of claim 1, further comprising a pair of latching members formed on the roof mount and the suspending frame to lock the suspending frame within the slot.

3. The structure of claim 2, further comprising a release button controlling the engagement between the latching members.

4. The structure of claim 1, further comprising an illumination device and a power switch of the illumination device.

5. The structure of claim 4, wherein the power switch is interlocked with the suspending frame and controlled by the movement of the suspending frame.

6. The structure of claim 1, wherein the latching mechanism including a female latching member formed on the suspending frame at one side of the receiving space and a male latching member formed on one side of the flat panel display.

7. The structure of claim 1, wherein the suspending frame includes at least one power supply terminal at one side of the receiving space.

8. The structure of claim 7, wherein the flat panel display includes a power input terminal to be connected to the power supply terminal while being installed in the suspending frame.

9. A rack-mount structure installed on a roof of a vehicle, comprising:
   a roof mount fitted to the roof, the roof mount includes a slot therein;
   a suspending frame pivotally connected to one side of the slot, the suspending frame including a receiving space for receiving a flat panel display therein and a glass plate covering one side of the receiving space; and
   a latching mechanism for releasably securing the flat panel display to the suspending frame.

10. A rack-mount flat panel display to be installed on a roof of a vehicle, comprising:
   a rack mount, further comprising:
      a roof mount fitted on the roof, the roof mount including a slot;
      a suspending frame pivotally connected to one side of the roof mount, such that the suspending frame can be retracted within the slot or rotate to an open position, the suspending frame including a receiving space and a glass plate covering one side of the receiving space; and
      a flat panel display, to be removably installed in the receiving space.

11. The display of claim 10, wherein the suspending frame includes a female latching member formed at one side of the receiving space, and the flat panel display includes a male latching member engageable with the female latching member.

12. The display of claim 10 wherein the flat panel display includes a liquid crystal display.

13. The display of claim 10, further comprising a pair of latching members formed on the roof mount and the suspending frame for securing the suspending frame within the slot.

* * * * *